United States Patent [19]
Kassai

[11] 4,411,472
[45] Oct. 25, 1983

[54] HAMMOCK FOR BABY CARRIAGES
[75] Inventor: Kenzou Kassai, Osaka, Japan
[73] Assignee: Kassai Kabushikikaisha, Osaka, Japan
[21] Appl. No.: 248,426
[22] Filed: Mar. 27, 1981
[30] Foreign Application Priority Data
  Apr. 11, 1980 [JP] Japan ................... 55-48200
[51] Int. Cl.³ ............................................. A47C 7/50
[52] U.S. Cl. ..................................... 297/430; 297/45
[58] Field of Search ................ 297/430, 431, 429, 45, 297/DIG. 4
[56] References Cited
U.S. PATENT DOCUMENTS

| | | | |
|---|---|---|---|
| 2,081,181 | 5/1937 | Long ............................. | 297/429 X |
| 2,609,864 | 9/1952 | Gates, Jr. ...................... | 297/430 X |
| 3,767,190 | 10/1973 | Biggerstaff ..................... | 297/439 X |
| 3,968,991 | 7/1976 | Maclaren ....................... | 297/45 |
| 3,989,295 | 11/1976 | Sparkes ......................... | 297/45 X |
| 4,317,581 | 3/1982 | Kassai .......................... | 297/DIG. 4 X |

FOREIGN PATENT DOCUMENTS 1133517  7/1962  Fed. Rep. of Germany ...... 297/429

Primary Examiner—William E. Lyddane
Attorney, Agent, or Firm—W. G. Fasse; D. H. Kane, Jr.

[57] ABSTRACT

A hammock for a baby carriage has a seat and a back rest. The seat includes a seat extension at the front end thereof. The seat is formed on right and left tubular slide guide rods extending longitudinally. Each of the sliders is inserted into the respective one of the slide guide rods from the front so as to be slidably guided by the slide guide rod. A belt for reinforcement is stretched between the right and left sliders. By forwardly pulling out the sliders, the seat extension is brought into a substantially horizontally extending position, whereby the hammock is provided with a seat extension function.

5 Claims, 11 Drawing Figures

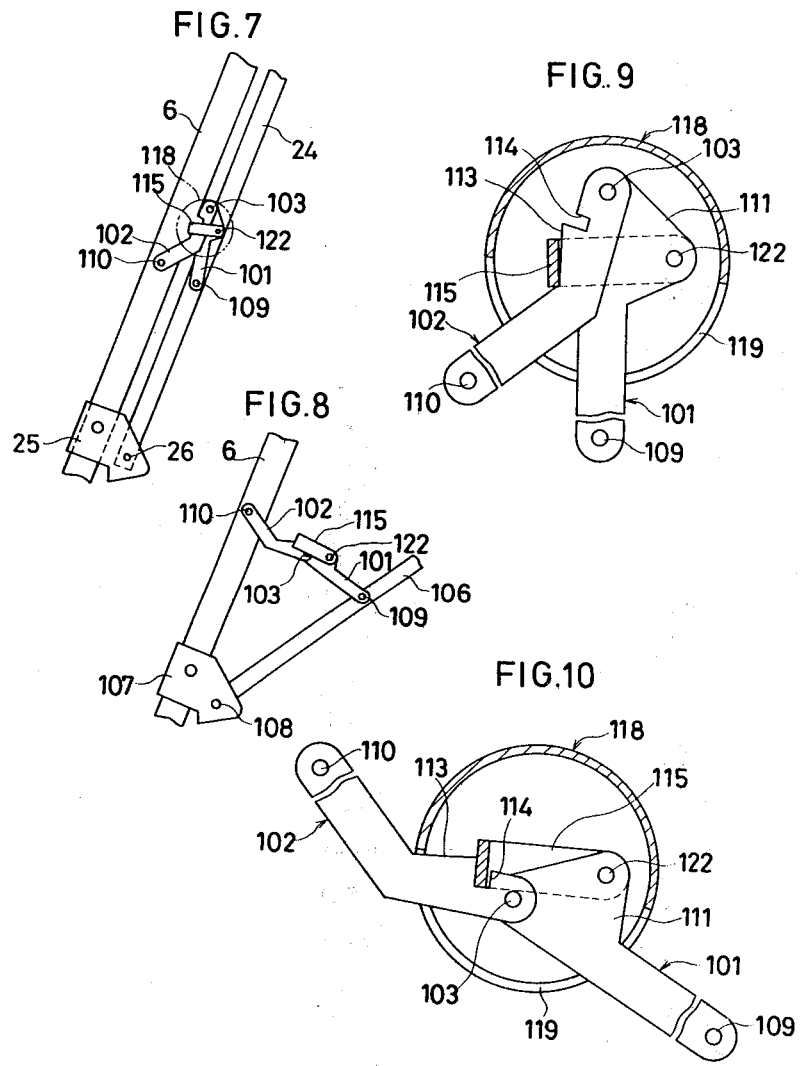

HAMMOCK FOR BABY CARRIAGES

BACKGROUND OF THE INVENTION

1. Field of the Invention

The present invention relates to a hammock for baby carriage and more particularly to improvements in the seat of a hammock provided with such seat and a back rest.

2. Description of the Prior Art

Baby carriages have various forms of hammocks attached thereto, and a chair type hammock having a seat and a back rest is in wide use. When a baby is resting in a chair type hammock, the baby's legs are allowed to hang down or placed on a foot rest attached to the baby carriage.

Some of the chair type hammocks described above have their back rest adapted to be reclined. In this case, the hammock assumes a bed form when the back rest is reclining. If the baby's legs still hang down or are placed on the foot rest, it is assumed that this is always comfortable to the baby. However, this may not always be so. Therefore, it is desired to provide an arrangement which makes it possible to selectively extend the front end of the seat of the hammock. If the front end of the seat can be extended as described above, the baby is allowed to extend its legs and will thus feel more comfortable.

Hammocks having such seat extending function have already been proposed. In the conventional arrangement, a seat extension is rotatably attached to the front end of the seat and so arranged that when rotated to assume a substantially horizontally extending position, it forms part of the seat to provide a broader or longer seat. This conventional seat extension, however, has a disadvantage that when it is extended substantially horizontally, a support bar attached to the baby carriage is operated to maintain the horizontal state of the seat extension, which makes the construction and operation somewhat complicated. Further, the addition of a special part, such as a support bar, to the baby carriage is not preferable as it increases the cost of the product.

SUMMARY OF THE INVENTION

According to the present invention, there is provided a hammock for a baby carriage in which a seat extending function can be obtained by adding a simple mechanism to the conventional construction.

In summary, the present hammock for baby carriages is provided with a substantially horizontally extending seat and a back rest upwardly extending from the rear end of the seat. The seat is provided with a seat extension at the front end thereof. The hammock further comprises tubular slide guide rods and sliders. The tubular slide guide rods longitudinally extend under the lower surface of the seat. Each of the sliders is inserted into the associated slide guide rod from the front so as to be slidably guided by the slide guide rod. In this arrangement, the seat extension is brought into a substantially horizontally extending position by pulling out in the forward direction the slider.

In a preferred embodiment of the invention, the slide guide rods and the sliders are respectively provided in a pair. First and second reinforcing members are connected respectively between the front ends of the pair of slide guide rods and between the front ends of the pair of sliders, whereby the seat is positioned on the first and second reinforcing members.

In a further preferred embodiment of the present invention, the baby carriage to which the hammock is attached is foldable, and as it is folded and unfolded, the pair of slide guide rods and the pair of sliders are moved toward and away from each other. In such arrangement, the first and second reinforcing members are formed of flexible belting.

In still another preferred embodiment of the present invention, the hammock further comprises a third reinforcing member which is connected between the first reinforcing member and the second reinforcing member. The third reinforcing member serves as a member for defining the front terminal end of the sliding movement of the slider.

Accordingly, an object of the present invention is to provide a hammock for baby carriages which is simple in construction and nevertheless has a seat extension function.

Another object of the present invention is to provide a hammock for baby carriages, wherein the seat can be extended in a simple operation.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a side view showing a back rest retaining rod for retaining the back rest of a hammock, the back rest retaining rod being in its raised state;

FIG. 8 is a side view showing the back rest retaining rod in its lowered state;

FIG. 9 is a diagrammatic side view of the principal portion of FIG. 7;

FIG. 10 is a diagrammatic side view of the principal portion of FIG. 8; and

DESCRIPTION OF THE PREFERRED EMBODIMENTS

Figure 1:
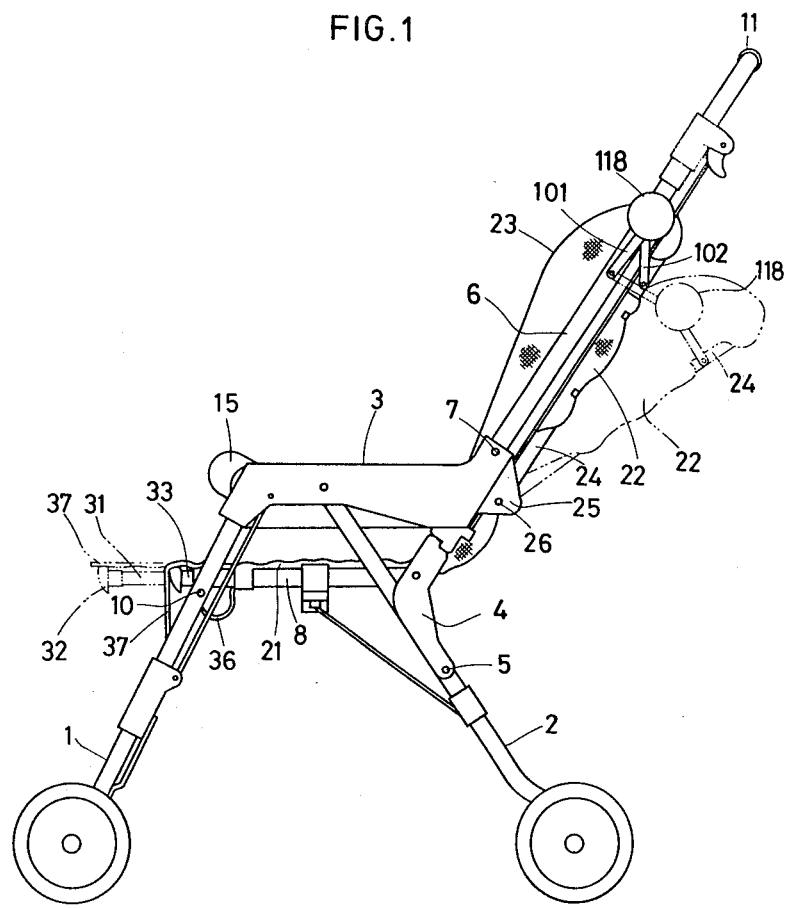
FIG. 1 is a side view of a baby carriage employing an embodiment of the present invention.
Figure 2:
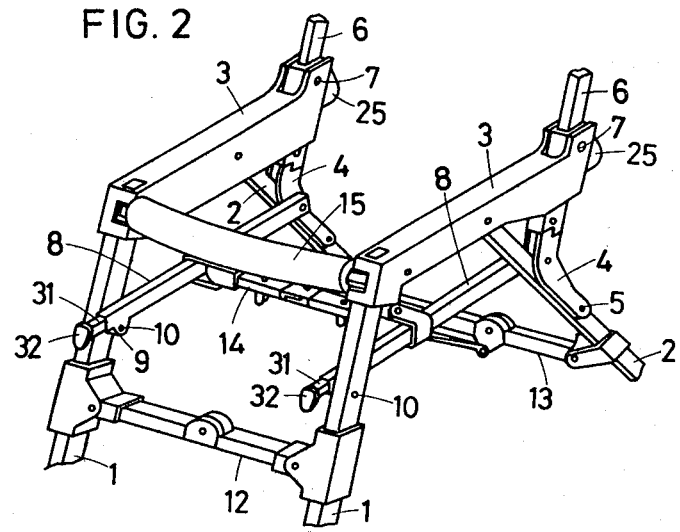
FIG. 2 is a perspective view diagrammatically showing the middle region of the baby carriage of FIG. 1.

FIG. 1 is a side view of a baby carriage according to an embodiment of the invention. FIG. 2 is a perspective view of the principal portion of the baby carriage of FIG. 1. First, an example of the construction of a baby carriage to which an embodiment of the invention is advantageously applied will be described.

Front legs 1 and rear legs 2 are rotatably connected to support leg pusher rod connecting rods 3. A pusher rod support angle member 4 is rotatably connected to the middle region of each rear leg 2 by a pivot pin 5. The upper end of the pusher rod support angle member 4 has a pusher rod main body 6 foldably attached thereto. The pusher rod main body 6 and support leg pusher rod connecting rod 3 are rotatably connected together by a pivot pin 7. A folding operative connecting rod 8 is rotatably connected at its opposite ends to the front leg 1 and pusher rod support angle member 4. The portion for connecting the folding operative connecting rod 8 and front leg 1 is provided by attaching the folding operative connecting rod 8 to the front leg 1 by a pivot pin through a bracket 9 formed on the folding operative connecting rod 8.

A foldable grip 11 connects the upper ends of the right and left pusher rod main bodies 6. Further, foldable connecting rods 12, 13 and 14 are connected between the right and left front legs 1, between the right and left rear legs 2 and between the right and left folding operative connecting rods 8, respectively.

The baby carriage described above is constructed for folding. That is, in the folding operation, the front legs 1, rear legs 2, support leg pusher rod connecting rods 3, pusher rod main bodies 6 and folding operative connecting rods 8 are brought into substantially horizontal position while the grip 11, connecting rods 12, 13 and 14 are folded such that the right and left members of each connecting rod move toward each other.

In addition, a foldable torso guard 15 may be connected between the front ends of the pair of support leg pusher rod connecting rods 3.

The arrangement of a hammock added to the baby carriage of a basic construction described above will now be described. The hammock comprises a seat 21 and a back rest 22. Since the back rest 22 has side plates 23 which rise from both sides, it is not clearly shown in FIG. 1. The seat 21 is formed to extend substantially horizontally on the folding operative connecting rods 8 and the connecting rod 14. The back rest 22 is formed to rise from the rear end of the seat 21 and is held by back rest holding rods 24. The back rest holding rod 24 is pivotally connected by a pivot pin 26 to a connecting member 25 fixed to the lower end of the pusher rod main body 6. The reclined state of the back rest 22 can be changed by rotating the back rest hoding rods 24. The arrangement for changing the angle of inclination of the back rest holding rods 24 will now be described.

Figure 3:
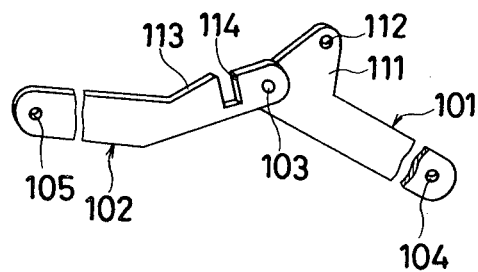
FIG. 3 is a perspective view of first and second connecting rods comprised in the reclining adjusting mechanism of the back rest.
Figure 4:
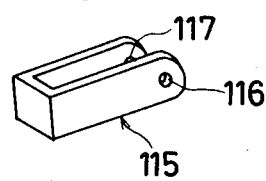
FIG. 4 is a perspective view of a rocking member used in combination with the connecting portion of the connecting rods of FIG. 3.
Figure 5:
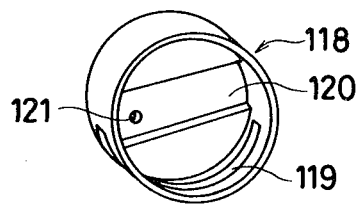
FIG. 5 is a perspective view showing a cover to receive the connecting portion for the connecting rods of FIG. 3.
Figure 6:
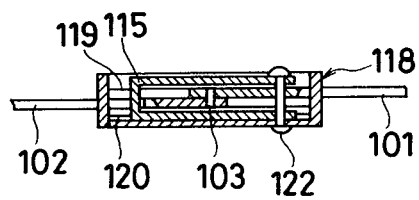
FIG. 6 is a section showing the connecting portion of the first and second connecting rods of FIG. 3.

FIGS. 3 to 10 serve for explanation of a reclining adjusting mechanism for the back rest 22. FIG. 3 is a perspective view showing first and second connecting rods; FIG. 4 is a perspective view showing a locking member; FIG. 5 is a perspective view showing a cover; FIG. 6 is a sectional view showing a connecting portion for the first and second connecting rods; FIG. 7 is a side view showing a back rest holding rod for holding a hammock back rest in a raised condition; FIG. 8 is a side view showing the back rest holding rod in a lowered condition; FIG. 9 is a side view diagrammatically showing the principal portion of FIG. 7; and FIG. 10 is a side view diagrammatically showing the principal portion of FIG. 8.

Referring to FIG. 3, a first connecting rod 101 and a second connecting rod 102 are pivotally connected by a pivot pin 103 so that they are foldable relative to each other. The respective ends of the first and second connecting rods 101 and 102 are provided with throughgoing holes 104 and 105, respectively. The first and second connecting rods 101 and 102 as shown in FIG. 1 are connected between the pusher rod body 6 and a back rest holding rod 106.

The throughgoing holes 104 and 105 shown in FIG. 3 are used for connecting the first and second connecting rods 101 and 102 between the pusher rod body 6 and the back rest holding rod 24. Thus, the first and second rods are pivotally supported by the back rest holding rod 24 and pusher rod body 6 through pivot pins 109 and 110 inserted in the throughgoing holes 104 and 105, respectively.

The first connecting rod 101 is formed with a projection 111 having a throughgoing hole 112. The second connecting rod 102 has a bent shape as a whole and is formed with first and second engaged portions 113 and 114. The first engaged portion 113 is simply a contour extending from the second engaged portion 102, but, in fact, it serves as such engaged portion, as will be understood from a description to be given later. The second engaged portion 114 is defined by a notch.

Referring to FIG. 4, a locking member 115 is formed as a U-shape provided with throughgoing holes 116 and 117 at its opposite ends.

Referring to FIG. 5, a cover 118 is formed as a cylindrical shape with a bottom and with a cylindrical wall having a cutout 119 extending through about 180°. The bottom surface of the cover 118 has a recess 120. A throughgoing hole 121 is provided in the recess 120 at near one end thereof.

Referring to FIGS. 6 to 10, the manner of assembling said first and second connecting rods 101, 102, locking member 115 and cover 118 will now be described. The first step is to secure alignment between the throughgoing hole 112 in the first connecting rod 101, the throughgoing holes 116 and 117 in the locking member 115 and the throughgoing hole 121 in the cover 118. In addition, in this arranged condition, the cover 118 shown in FIG. 5 has been turned over from the illustrated position. In this arranged condition, a pivot pin 122 is inserted into the throughgoing holes 112, 116, 117 and 121. In this condition, one lateral surface of the locking member 115 fits in the recess 120 in the cover 118, so that the locking member 115 and cover 118 are allowed to turn as a unit. The first and second connecting rods 101 and 102 are led out through the cutout 119 in the cover 118.

By comparing FIGS. 7 and 9 with FIGS. 8 and 10, the operation of the reclining mechanism will now be described. In FIGS. 7 and 9, the first and second connecting rods 101 and 102 are in the most folded condition, with the locking member 115 engaging the engaged portion 113. In this condition, since the first and second connecting rods 101 and 102 are fixed by the locking member 115 so as not to open any further, the back rest holding rod 24 is fixed substantially parallel to the pusher rod body 6, i.e., with the back rest 22 of the hammock in the raised condition.

When it is desired to bring the back rest 22 of the hammock into the lowered condition from the above mentioned raised condition, the locking member 115 is turned clockwise to be disengaged from the first engaged portion 113. This operation may be performed by utilizing the cover 118 as a knob since if it is turned clockwise the locking member 115 is turned integrally therewith. With the locking member 115 disengaged, lowering of the back rest holding rod 24 will establish the condition in which the first and second connecting rods 101 and 102 are straightened to the fullest extent. Even if the hand is then removed from the cover 118, the locking member 114 will be automatically engaged by the engaged portion 114 because since the cover 118 and locking member 115 are pivotally supported on the offset pivot pin 122, their forces of gravity tend to turn in the same counterclockwise direction at all times. The manner of engagement betwen the locking member 115 and the second engaged portion 114 is shown in FIGS. 8 and 10.

In this condition, the back rest 22 of the hammock is in its lowered condition. When it is desired to bring the back rest 22 of the hammock into the raised condition, the cover 118, serving as a knob, is turned clockwise to undo the engagement between the locking member 115 and engaged portion 114, turning the back rest holding rod 24 to raise the latter. In the final stage of this raising operation, as in the case of FIGS. 8 and 10, the forces of gravity of the locking member 115 and cover 118 produce a counterclockwise turning of the locking member 115 to automatically engage the first engaged portion 113.

Instead of utilizing gravitation, a spring may be used.

The first cover 118 has been described as being usable as a knob, but the cover also provides safety by covering the connection portions of the first and second connecting rods 101 and 102.

Figure 11:
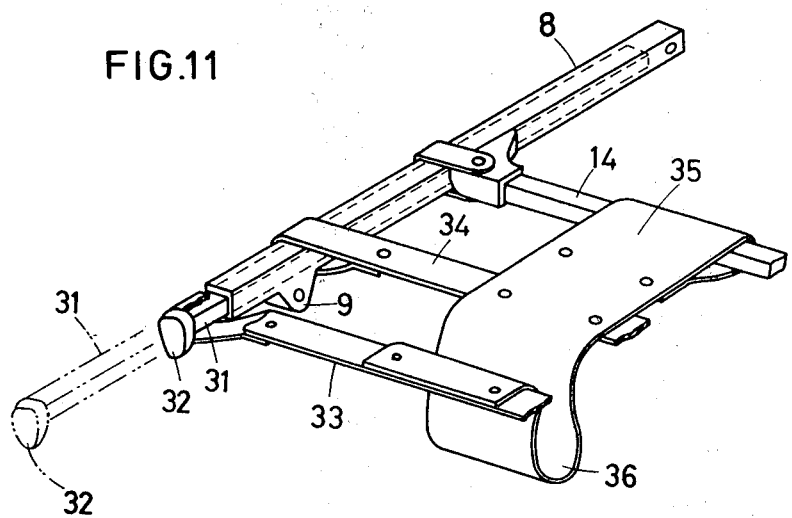
FIG. 11 is a perspective view of the principal portion around a holding operative connecting rod of FIG. 1, illustrating the seat extending function of the hammock.

Next, the seat extending function which forms the subject matter of the invention will now be described. FIG. 11 is a perspective view of the principal portion around the folding operative connecting rods 8 shown in FIG. 1.

The folding operative connecting rods 8 are formed of hollow pipes. Each folding operative connecting rod 8 has a slider 31 in the form of a bar slidably inserted therein. Thus, the folding operative connecting rods 8 function as slide guide rods. The front end of the slider 31 is formed with an operating portion 32 so that the operator may engage his finger with it to draw out the slider 31 or he may push it with the hand to bring the slider 31 back to its retracted position. A belt 33 for reinforcement is stretched between the front ends of the right and left sliders 31. Further, a belt 34 for reinforcement is also stretched between the right and left folding operative connecting rods 8 forwardly of said connecting rod 14. A wide third belt 35 extending in a direction which crosses the belts 33 and 34 is fixed so as to connect the belts 33, 34 and connecting rod 14. The belts 33, 34, 35 are formed of bendable belting material. In addition, when the sliders 31 are not drawn out, there is a sag or loop 36 in the wide third belt 35. Thus, the length of the wide third belt 35 is determined such that the end of the drawing-out of the sliders 31 is defined with said sag 36 straightened out. The seat 21 described above is formed by these belts 33, 34, 35 positioned between the right and left folding operative connecting rods 8, and on the connecting rod 14. As best shown in FIG. 1, the seat 21 includes a seat extension 37 forming said loop 36 sagging from the front end thereof when it is not extended.

The seat extension 37 is particularly used when the back rest 150 of the hammock is lowered into a bed form, as shown in phantom lines in FIG. 1. That is, it is more comfortable for the baby to straighten its legs when the hammock takes a bed form. Thus, if the sliders 31 are drawn out by means of the operating portions 32, the seat extension 37 is positioned on the first belt 33 and the front end of wide third belt 35 and extends horizontally. This allows the baby to straighten its legs on the seat extension 37. If the back rest 22 of the hammock is raised into a chair form, the seat extension 37 may not be necessary. In this case, if the sliders 31 are pushed in by means of the operating portions 32, the seat extension 37 is brought into its sagging state, thus allowing the baby to hang down its legs or place its feet on the foot rest. The foot rest can be easily attached by utilizing the connecting rod 12.

In addition, even when the hammock assumes the chairlike state with the seat extension 37 hanging down, it does not always follow that the seat extension 37 becomes unnecessary. More particularly, for a young baby whose legs do not reach to the foot rest, the seat extension 37 effectively acts as a wall for supporting the baby's legs. This is because the seat extension 37, though not fixedly supported, is formed of a sufficiently rigid material to support the baby's legs. In such case, suitable cushioning will be imparted to the baby's legs. Further, the seat extension 37, when hanging down, performs the function of a guard to protect the baby's legs against danger. It also provides protection against cold. Thus, the seat extension 37 has a plurality of functions when it hangs down and when it assumes a horizontal position.

As has been described so far, according to the present invention, since a slide mechanism for the seat extension is employed, the seat can be extended in a simple operation. Further, since the slide guide rods for slidably guiding the sliders may be in the form of the members originally provided for holding the seat of the hammock, the seat extending function can be obtained by adding a simple mechanism to the conventional construction.

In addition, in the embodiment described above, the invention has been described as applied to a foldable type baby carriage, but it will be understood that it may be likewise applied to a baby carriage which has no folding function. In that case, the first and second belts 33 and 34 need not be flexible and may be made of any suitable material.

Further, although the back rest 22 has been made reclinable in the above embodiment, the effects of the invention can be expected regardless of such function. That is, if the baby is so young that its legs do not reach to the foot rest and instead hang down, there may be cases where it is more comfortable for the baby to be allowed to extend its legs by forming a seat extension.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hammock for baby carriages which is provided with a substantially horizontally extending seat and a back rest upwardly extending from the rear end of said seat, said hammock comprising: a pair of tubular slide guide rods longitudinally extending under the lower surface of said seat, a pair of sliders each inserted into the associated slide guide rod from the front so as to be slidably guided by said slide guide rod, and a first reinforcing member connected between the front ends of said pair of sliders, said seat including a flexible seat extension hanging down in a loop (36) from a front end of the seat when said pair of sliders are recessed in said guide rods, said flexible seat extension being operatively connected to said first reinforcing member (33) for extending said seat extension loop by forwardly pulling out said sliders, whereby said seat extension is brought into a substantially horizontally extending position by straightening the loop.

2. The hammock for baby carriages as set forth in claim 1, which further comprises a second reinforcing member (34) connected between said pair of slide guide rods substantially near the front ends of said slide guide rods, whereby said flexible seat extension is positioned on and between said first and second reinforcing members (33, 34).

3. The hammock for baby carriages as set forth in claim 2, wherein the baby carriage to which the hammock is attached is foldable, and as it is folded and unfolded, said pair of slide guide rods and said pair of sliders are moved toward and away from each other, and wherein:

said first and second reinforcing members are formed of flexible belting.

4. The hammock for baby carriages as set forth in claim 2, wherein said seat further comprises a third reinforcing member (35) in the form of a wide belt being connected between said first reinforcing member (33) and said second reinforcing member (34), said third reinforcing member (35) forming said loop (36) and limiting the front terminal end position of the pull-out slide movement of the sliders.

5. The hammock for baby carriages as set forth in claim 1, or 2, or 3, or 4, further comprising means for connecting said back rest to the baby carriage for reclining said back rest.

* * * * *